United States Patent
Sørensen et al.

(10) Patent No.: US 7,932,473 B2
(45) Date of Patent: Apr. 26, 2011

(54) ACTUATOR WITH MEANS FOR DETERMINING THE POSITION OF AN ACTIVATION ELEMENT

(75) Inventors: René Sørensen, Gråsten (DK); Marin K. Knudsen, Sydals (DK)

(73) Assignee: Linak A/S, Nordborg (DK)

( * ) Notice: Subject to any disclaimer, the term of this patent is extended or adjusted under 35 U.S.C. 154(b) by 486 days.

(21) Appl. No.: 11/988,680

(22) PCT Filed: Jul. 13, 2006

(86) PCT No.: PCT/DK2006/000413
§ 371 (c)(1),
(2), (4) Date: Jan. 11, 2008

(87) PCT Pub. No.: WO2007/006313
PCT Pub. Date: Jan. 18, 2007

(65) Prior Publication Data
US 2009/0120220 A1    May 14, 2009

(30) Foreign Application Priority Data

Jul. 13, 2005   (GB) .................................. 0514392.0
Aug. 30, 2005  (DK) ................................. 2005 01199
Feb. 20, 2006  (GB) .................................. 0603326.0

(51) Int. Cl.
    *H01H 3/16*    (2006.01)
(52) U.S. Cl. .................. 200/61.41; 200/61.91
(58) Field of Classification Search ............... 200/61.41, 200/61.91
    See application file for complete search history.

(56) References Cited

U.S. PATENT DOCUMENTS

| 2,910,027 | A | * | 10/1959 | Winz ............................ 112/272 |
| 4,920,816 | A | | 5/1990 | Inabe et al. |
| 6,363,795 | B1 | | 4/2002 | Bergqvist et al. |
| 6,731,032 | B1 | | 5/2004 | Muszynski |
| 7,047,834 | B2 | | 5/2006 | Nielsen et al. |

FOREIGN PATENT DOCUMENTS

| DE | 3743159 | 6/1989 |
| EP | 0577541 | 1/1994 |
| EP | 0685662 | 12/1995 |
| WO | 03033946 | 4/2003 |
| WO | 2006039931 | 4/2006 |

* cited by examiner

*Primary Examiner* — Renee S Luebke
*Assistant Examiner* — Lisa Klaus
(74) *Attorney, Agent, or Firm* — Dykema Gossett PLLC

(57) ABSTRACT

Actuator comprising of a quick release unit and a means for determining the position of an activation element. With the quick release unit it is possible to release the activation element from the actuator's electric motor and the transmission or, at least part of it, to make a rapid adjustment to the activation element without the motor and transmission. The means typically used for determining the position of the activation element comprises of a potentiometer, an optical or magnetic encoder indirectly driven by the motor. By connecting the instrument for position determination (33) to the spindle (2) or the part of the transmission between the quick release and the spindle (2), the position of the activation element remains known regardless of whether it is released or connected, or has been released.

7 Claims, 4 Drawing Sheets

Figure 1:
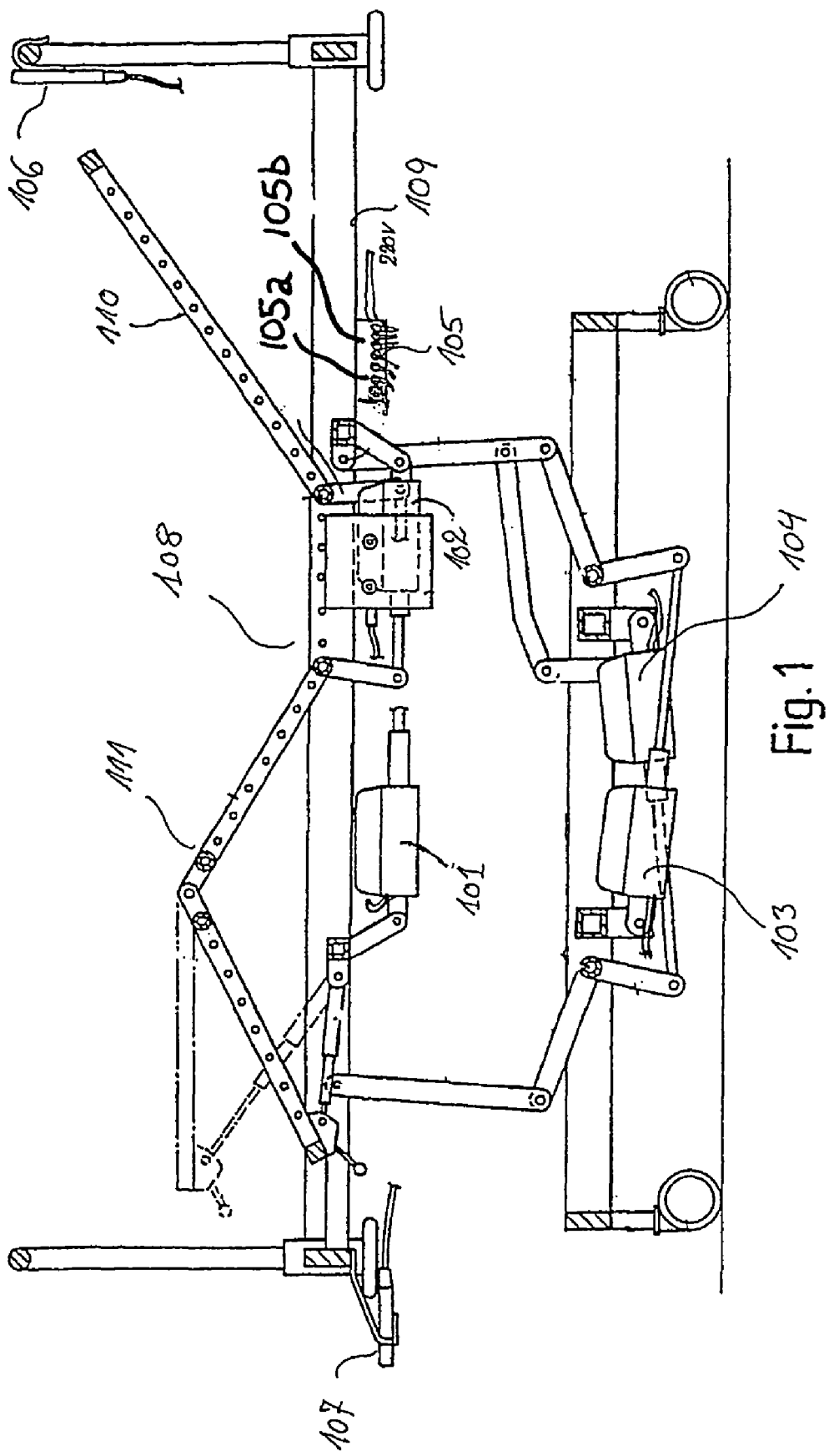

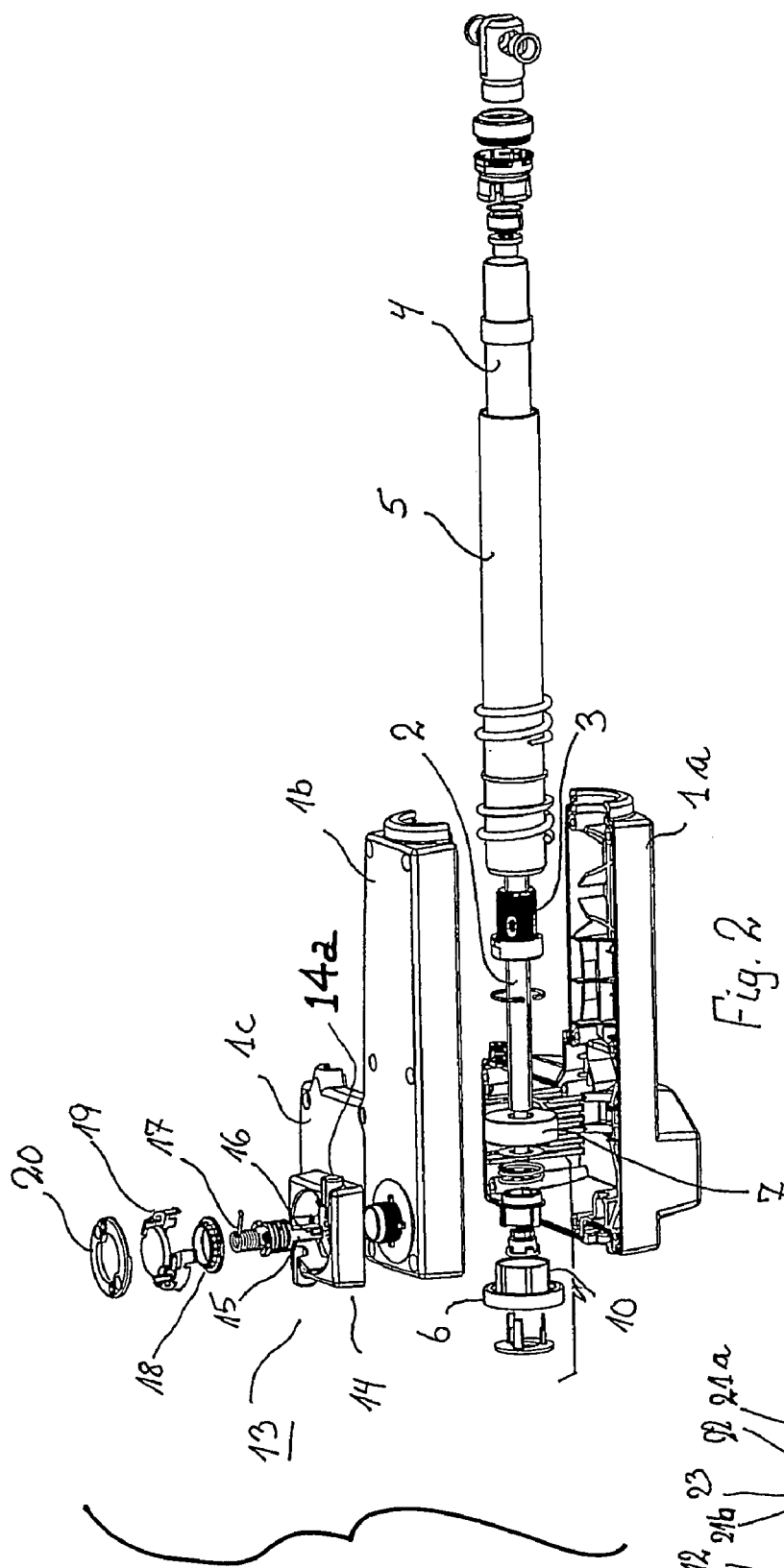
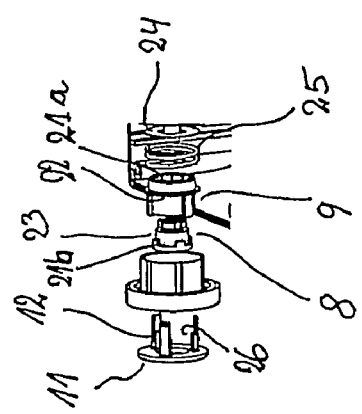
Fig. 2
Fig. 3

ACTUATOR WITH MEANS FOR DETERMINING THE POSITION OF AN ACTIVATION ELEMENT

BACKGROUND OF THE INVENTION

1. Field of the Invention

The invention relates to an actuator which includes a quick release unit on a transmission between an activation element and a reversible motor.

2. The Prior Art

The description of the invention departs from a linear actuator, comprising an electric motor which operates a spindle through a transmission. On the spindle there is a spindle nut with a piece of tubing attached at one end; this serves as the activation element. The other end of the piece of tubing is attached to the movable element in the construction where the actuator is built-in, while the other part of the actuator is attached with a rear fixture to the stationary part of the construction. By keeping the spindle nut from rotating, the nut is moved either outwards or inwards on the spindle, depending on the direction of rotation, and the piece of tubing is either moved axially outward or retracts in a manner similar to a piston rod in a telescopic cylinder.

The registration of the position of the tubing is typically performed by counting the number of revolutions made by the spindle from its initial position. The number of revolutions multiplied by the thread pitch determines the position of the tubing. An absolute determination of the position can be made using a potentiometer operated by the motor through a gearing. When the transmission ratios are known, the revolutions of the spindle can be calculated. A more common way of determining the position is by use of a magnetic or optical decoder. A magnetic encoder comprises a magnetic ring with a number of poles which activate a read-switch or Hall-element each time one of the poles passes the switch, thereby producing an electrical signal. Typically, with four poles, the position is determined by each quarter revolution of the spindle. An optical encoder works in the same way using a rotating disc with perforations and a light source. When a perforation passes the light source, light passes through to a photocell producing an electrical signal. Based on the signals, the position is calculated by a microprocessor in the control.

A quick release in an actuator is used for temporary release of the activation element for manual setting. An example of use of the quick release is in hospital beds, fire doors and other constructions where it is important or even essential to be able to spontaneously set the activation element.

Actuators with quick release function are known from, amongst others, EP 685 662 B1, WO 03/033946 A1 and WO 03/033946 A1 and EP 577 541 B1 all in the name of Linak A/S. The first three documents relates to a quick release construction based on a releasable clutch spring around a cylinder part on the activation element and a matching cylinder element from the exit of the motor/transmission. The last document EP 577 541 relates to a quick release construction using an angular gear where the pinion from the output of the motor/transmission may be displaced to release the grip with the pinion on the activation element.

A problem with the known actuators with quick release function is that the position determination is lost at release of the quick release, and it is necessary to reset the system. This is not normally a problem as the system is set up to reset the actuator by driving it to an outer position, and release of the quick release usually results in the actuator being brought to an outer position.

In some situations it may also be desirable to know the position after the quick release has been activated without the need to bring the actuator to an end position.

SUMMARY OF THE INVENTION

The purpose of the invention is to provide a solution to the problem described.

This is, according to the invention, provided by designing the actuator to include a means of position determination connected to the spindle or the part of the transmission between the quick release and spindle, so that the position of the activation element is continuously determined, regardless of whether the spindle is coupled in or out.

The invention has the advantage that the instrument used for position determination can be a well known one based on magnetic or optical encoders or a potentiometer. In a magnetic encoder, the magnetic ring may be directly or indirectly attached to the spindle and the same applies for the disc with perforations in an optical encoder. The rotary potentiometer may be operated directly or indirectly by the spindle. The sensors mentioned may, of course, also be connected to the part of the quick release that is attached to the spindle. For position determination it is appropriate to use two Hall-elements angularly displaced to each other.

A linear actuator as defined in the invention will be specified below with reference to the attached drawings.

FIG. 1, a bed
FIG. 2, an exploded illustration of the actuator.
FIG. 3, a detailed illustration of the quick release unit
FIG. 4, a longitudinal section through another actuator,
FIG. 5, the actuator in FIG. 5 seen from the side
FIG. 6, an exploded illustration of the quick release unit.

DETAILED DESCRIPTION OF THE PREFERRED EMBODIMENTS

FIG. 1 shows a hospital bed equipped with an actuator system comprising four actuators 101-104, a control box 105 containing a power supply 105*a* and a control 105*b*; and there is a hand control 106 and an operations panel (ACP) 107 at the end of the bed (operation unit). The power supply consists of a low voltage unit, typically transformer-based, and a rechargeable battery pack. Two of the actuators 101, 102 are for adjustment (profiling) of the base 108 carrying the mattress, while the two other 103, 104 are for height adjustment of the upper frame 109 on which the base is mounted. The two actuators last mentioned also allow for tilting of the base frame over a transverse axis (Trendelenburg/Anti-Trendelenburg position).

In FIG. 2 is shown an actuator with a quick release construction of the type mentioned in WO 2006/039931, more precisely FIGS. 1-7 therein. The main element of the actuator is a cabinet in two parts 1*a*, 1*b* with a reversible electric motor, which through a worm gear drives a spindle 2 with a spindle nut 3, on which an activation rod 4 (inner tube) surrounded by a protective tube 5 (outer tube) is attached. Note that the motor is not shown on the drawing, but this is located in the perpendicular section 1*c* of the cabinet. The motor shaft extends into a worm gear 6. The spindle 2 is seated in the cabinet with a ball bearing 7.

The quick release construction, which includes inner and outer couplings parts 8,9, where the inner coupling part 8 is mounted at the end of spindle 2, while the outer coupling part 9 is mounted in the worm wheel 6. On the side facing the front end of the actuator, this worm wheel is designed with a hollow cylindrical part that accommodates the outer coupling part 9 for torque transfer with a spline connection.

In the back of the worm wheel is a circular disc 11 with three legs 12 protruding through the openings in the worm wheel into the hollow cylindrical part and guided there. In the upper part 1b of the cabinet is a release mechanism 13 in a housing 14 with an entry for a cable (not shown), leading to an operating handle (not shown either). The release mechanism comprises an axle unit 15, led down behind the circular disc 11. At the end of the axle unit is a cam 16 which, by turning the axle unit, is brought into contact with the disc 11 and presses this forward towards the worm wheel. The axle unit is spring loaded with a spring 17, to an inactive position, i.e., a position where the cam 16 is not in contact with the disc 11. A ring 18 is attached at the upper end of the axle, to which the end of the cable leading to the operating handle is attached.

The outer coupling part 9, connected to the worm wheel, has an internal torque transfer spline connection 21a in the front. On the outer side of the coupling part 9 at the front end, in front of the spline connection to the worm wheel, there is a flange 22

The inner coupling part 8 has a narrow part 23 in the front so that it can pass through the opening in the part of the spline connection 21a placed in the outer coupling part 9. The other part of the spline connection is part of the step between the narrow end 23 and the outer side of the coupling part. In the narrow part 23 there is a groove for a disc 24, creating a flange.

The quick release is activated by operation of the release mechanism, which turns the cam 16 on the axle unit 15 into contact with disc 11, which is then pushed forward. The spline connection 21a, 21b between the outer coupling part 9 and the inner coupling part 8 will thus be interrupted and the spline will rotate freely, independent of motor and transmission. The activation rod 4 of the actuator and hence the element attached to it, will then be manually adjustable.

An electrical contact in the form of a micro switch is placed next to the turning axle 15, and a cam opposite cam 16 activates the micro switch at the same time as the quick release is activated. This sends an electrical signal through the cable connection to the control unit, which is brought from sleep mode, the power supply for the control is activated; more precisely that part of the power supply comprising the rechargeable battery pack. By keeping the battery pack switched off until it is required, i.e. use 'on demand', means a substantial saving of battery pack power. When the bed is connected to mains power, the low voltage unit is active. Placing the switch in the actuator itself has the advantage that further cabling is avoided as only the cable for the actuator is required.

When the bed is without mains power and the back section 110 must be moved rapidly to the horizontal position, such as in the case of a patient with cardiac arrest, this is achieved by activating the quick release. Simultaneously the control is brought from sleep mode and the bed becomes fully operational. The leg section 111 may be moved to the horizontal position and, if required, the bed may be brought into the Trendelenburg position.

Figure 4:
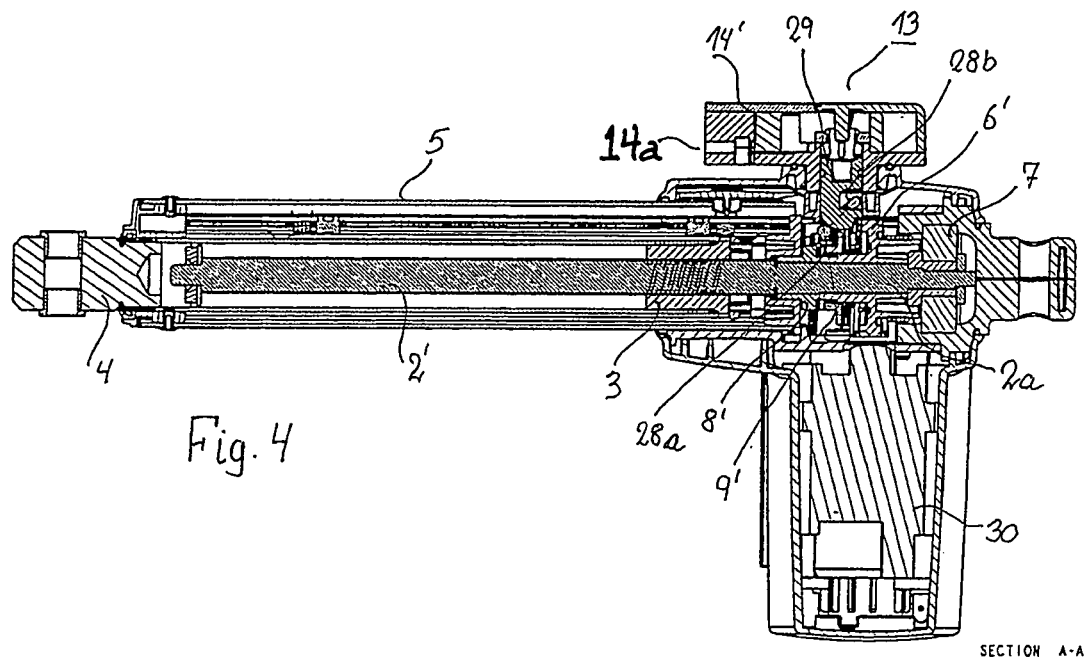
Figure 5:
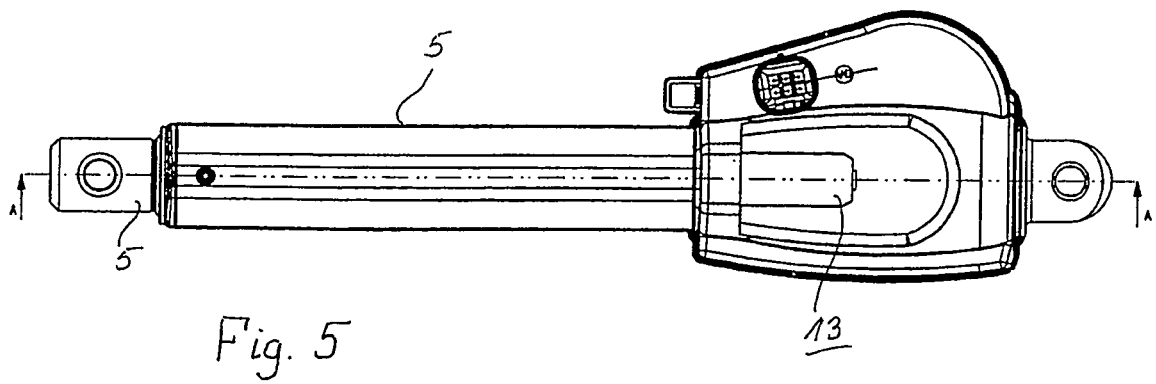
Figure 6:
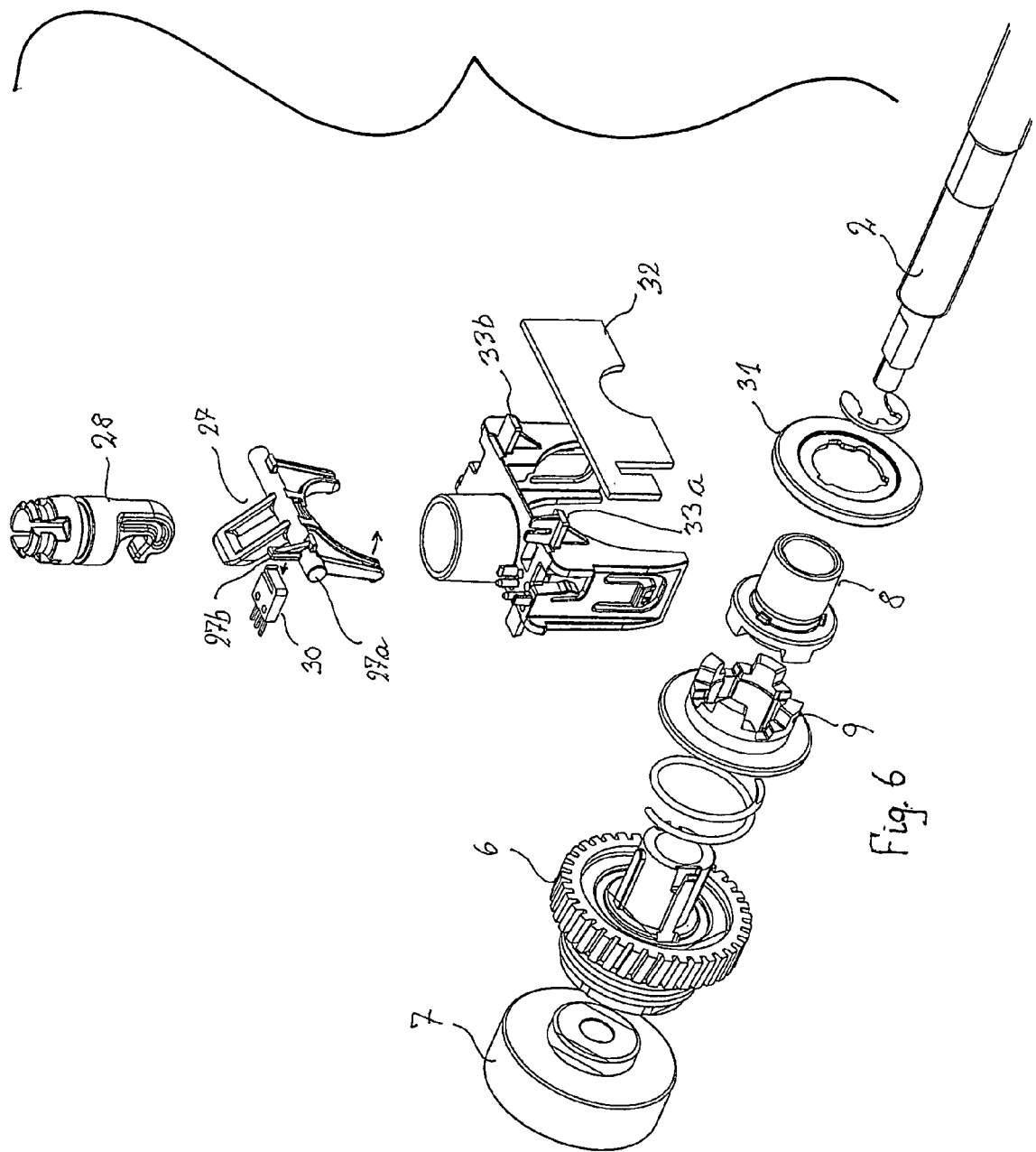

In FIGS. 4-5, the actuator shown is the same type as specified in WO 2006/039931 Linak A/S, specifically in FIGS. 8-15 therein and this is referred to as part of the present application. The quick release construction is shown in FIG. 4. Elements 2', 6', 8', 9' and 14' correspond to elements 2, 6, 8, 9 and 14 in the FIG. 2 embodiment. As seen in FIG. 6, the release mechanism includes a tilting element 27 that takes an inclined resting position. An axially sliding element 28 with a hook at the end grabs the tilting element and is connected to the operating handle with a cable. By operating the handle, element 28 is pulled upwards and brings the tilting element 27 to a vertical position, releasing the quick release as previously described.

To the tilting element 27 is connected a micro switch 30 activated by turning it. This supplies an electrical signal to the control unit through a cable and terminal 29, and consequently the control is brought from sleep mode. The tilting element 27 turns around an axle 27a, on the axle is an arm 27b which activates the micro switch 30.

The inner coupling part 8 is equipped with a magnetic ring 31 with four poles for position determination of the activation rod 4. Two Hall elements, or sensors, 33a, 33b on a small printed circuit board 32, work in conjunction with this. The elements 31, 33a and 33b constitute a magnetic encoder. The Hall-elements are activated when a pole passes these on rotation of the magnetic ring, thereby sending a signal to the control unit which, by means of a microprocessor, computes the position of the activation rod 4 based on the rotation, its direction and the thread pitch of the spindle. Because the two Hall- elements are angularly displaced in relation to the magnetic ring 31, the rotation direction of the spindle can be detected (quadrature detection) and determines whether signals must be added or subtracted depending on whether the activation rod 4 is extended or retracted. As the magnetic ring 31 is mounted on the inner coupling part 8, the ring 31 always rotates with the spindle; this will also be the case when the spindle is released from motor/transmission. Therefore, the position of the activation rod is known at all times, including after release of the quick release. The exact design of the controls is dependent on the circumstances; for example, it may be presumed that the spindle rotates in one direction and uses one Hall-element to register movement in the other direction, and the second Hall element to register the number of rotations. Both Hall-elements may of course be used to register rotation direction and number of rotations.

The actuator illustrated in FIG. 2 may be similarly equipped with a magnetic ring on the inner coupling and Hall-elements, so that the position of the activation rod is known regardless of whether the quick release has been activated or not.

The position of the bed is known, even after a quick release, through the position of the actuators. The position is used to control movement of the bed and to set various movement patterns.

The invention claimed is:

1. An actuator comprising
   an activation element,
   a reversible electric motor,
   a transmission which interconnects the activation element and the reversible electric motor,
   a quick release unit which is connected to said transmission for disconnecting the transmission when desired, a first part of the transmission being between the reversible electric motor and the quick release unit and a second part of the transmission being between the quick release unit and the activation element, said second part of the transmission including a spindle with a spindle nut attached to said activation element,
   a release mechanism for activating the quick release unit, and
   means for determination of a position of the activation element, said means being connected to said second part of the transmission.

2. The actuator according to claim 1, wherein the means for position determination include a magnetic encoder where a magnetic ring is directly or indirectly connected to the spindle.

3. The actuator according to claim 1, wherein the position is determined by use of two Hall-elements in angular displacement.

4. The actuator according to in claim 1, wherein the means for position determination include an optical encoder with a disc directly or indirectly connected to the spindle.

5. The actuator according to in claim 1, wherein the means for position determination include a rotary potentiometer directly or indirectly operated by the spindle.

6. The actuator according to claim 1, wherein the means for position determination are attached to a part of the quick release attached to the spindle.

7. The actuator according to claim 1, wherein said means for position determination includes a magnetic ring.

* * * * *